US011595631B2

United States Patent
Nakamura et al.

(10) Patent No.: US 11,595,631 B2
(45) Date of Patent: Feb. 28, 2023

(54) IMAGING DEVICE, IMAGE CAPTURING OPTICAL SYSTEM, AND MOVABLE APPARATUS

(71) Applicants: Kento Nakamura, Osaka (JP); Hiroyuki Satoh, Kanagawa (JP); Jun Kishiwada, Kanagawa (JP); Issei Abe, Kanagawa (JP)

(72) Inventors: Kento Nakamura, Osaka (JP); Hiroyuki Satoh, Kanagawa (JP); Jun Kishiwada, Kanagawa (JP); Issei Abe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/417,136

(22) PCT Filed: Mar. 3, 2020

(86) PCT No.: PCT/JP2020/008873
§ 371 (c)(1),
(2) Date: Jun. 22, 2021

(87) PCT Pub. No.: WO2020/184286
PCT Pub. Date: Sep. 17, 2020

(65) Prior Publication Data
US 2022/0070434 A1 Mar. 3, 2022

(30) Foreign Application Priority Data
Mar. 14, 2019 (JP) .............................. JP2019-046771

(51) Int. Cl.
*H04N 13/239* (2018.01)
*G01C 3/14* (2006.01)
(Continued)

(52) U.S. Cl.
CPC .............. *H04N 13/239* (2018.05); *G01C 3/14* (2013.01); *H04N 5/2259* (2013.01);
(Continued)

(58) Field of Classification Search
CPC ............... H04N 13/239; H04N 5/2259; H04N 5/23216; H04N 5/23238; H04N 5/23296;
(Continued)

(56) References Cited

U.S. PATENT DOCUMENTS

2006/0077543 A1   4/2006   Miyoshi et al.
2008/0158226 A1   7/2008   Shimizu
(Continued)

FOREIGN PATENT DOCUMENTS

CN   1798957 A   7/2006
CN   101918793 A   12/2010
(Continued)

OTHER PUBLICATIONS

Office Action dated May 27, 2022, in corresponding Chinese Patent Application 202080020735.4.
(Continued)

*Primary Examiner* — Christopher K Peterson
(74) *Attorney, Agent, or Firm* — Xsensus LLP

(57) ABSTRACT

An imaging device includes an imaging element, and an image capturing optical system configured to generate an image of an object on the imaging element. The image capturing optical system has a gradient decreasing region in which a change of a gradient of an image magnification rate with respect to an angle of view of the image generated on the imaging element decreases as a concerned position deviates farther away from an optical axis of the image capturing optical system, and a gradient increasing region in which the change of the gradient of the image magnification rate with respect to the angle of view of the image generated
(Continued)

on the imaging element increases as the concerned position deviates farther away from the optical axis of the image capturing optical system.

12 Claims, 18 Drawing Sheets

(51) Int. Cl.
 *H04N 5/225* (2006.01)
 *H04N 5/232* (2006.01)
 *H04N 5/341* (2011.01)
 *H04N 5/3745* (2011.01)
 *G02B 9/62* (2006.01)
 *G02B 13/00* (2006.01)
 *H04N 13/296* (2018.01)
 *G02B 27/00* (2006.01)

(52) U.S. Cl.
 CPC ..... *H04N 5/23216* (2013.01); *H04N 5/23238* (2013.01); *H04N 5/23296* (2013.01); *H04N 5/23299* (2018.08); *H04N 5/3415* (2013.01); *H04N 5/37455* (2013.01)

(58) Field of Classification Search
 CPC ............ H04N 5/23299; H04N 5/3415; H04N 5/37455; H04N 13/296; G01C 3/14; G02B 9/62; G02B 13/0045; G02B 27/0025
 See application file for complete search history.

(56) References Cited

U.S. PATENT DOCUMENTS

| | | | |
|---|---|---|---|
| 2009/0122422 A1 | 5/2009 | Yoshida et al. | |
| 2010/0254025 A1 | 10/2010 | Yoshida et al. | |
| 2010/0289895 A1 | 11/2010 | Imamura | |
| 2011/0169912 A1 | 7/2011 | Abe et al. | |
| 2012/0026285 A1 | 2/2012 | Yoshida et al. | |
| 2012/0056978 A1 | 3/2012 | Abe et al. | |
| 2013/0050405 A1 | 2/2013 | Masuda et al. | |
| 2013/0050408 A1 | 2/2013 | Masuda et al. | |
| 2014/0071226 A1 | 3/2014 | Satoh et al. | |
| 2014/0132709 A1 | 5/2014 | Satoh et al. | |
| 2015/0015664 A1 | 1/2015 | Masuda et al. | |
| 2015/0015766 A1 | 1/2015 | Satoh et al. | |
| 2015/0192762 A1 | 7/2015 | Satoh et al. | |
| 2015/0301316 A1 | 10/2015 | Masuda et al. | |
| 2016/0147045 A1 | 5/2016 | Masuda et al. | |
| 2016/0266359 A1 | 9/2016 | Amano et al. | |
| 2016/0313541 A1 | 10/2016 | Satoh et al. | |
| 2016/0337584 A1 | 11/2016 | Masuda et al. | |
| 2016/0353020 A1 | 12/2016 | Satoh | |
| 2017/0310895 A1 | 10/2017 | Masuda et al. | |
| 2018/0017768 A1* | 1/2018 | Betsui | G02B 13/003 |
| 2018/0024333 A1 | 1/2018 | Satoh et al. | |
| 2018/0120545 A1 | 5/2018 | Aihara et al. | |
| 2018/0213152 A1 | 7/2018 | Masuda et al. | |
| 2019/0086649 A1 | 3/2019 | Satoh et al. | |
| 2019/0243110 A1 | 8/2019 | Masuda et al. | |
| 2019/0273848 A1 | 9/2019 | Satoh | |
| 2019/0293900 A1 | 9/2019 | Toriumi et al. | |
| 2019/0293913 A1 | 9/2019 | Toriumi et al. | |
| 2019/0361232 A1 | 11/2019 | Nakamura et al. | |
| 2019/0391244 A1 | 12/2019 | Sekiguchi et al. | |
| 2020/0233215 A1 | 7/2020 | Nakamura et al. | |

FOREIGN PATENT DOCUMENTS

| | | |
|---|---|---|
| EP | 3214474 A1 | 9/2017 |
| EP | 3252514 A1 | 12/2017 |
| JP | 2006-343545 | 12/2006 |
| JP | 2010-530086 A | 9/2010 |
| JP | 2012-198077 | 10/2012 |
| JP | 5476668 B2 * | 4/2014 |
| JP | 2016-027438 | 2/2016 |
| JP | 2019-178871 | 10/2019 |
| WO | WO2007/110097 A1 | 10/2007 |

OTHER PUBLICATIONS

International Search Report dated Jun. 9, 2020 in PCT/JP2020/008873 filed on Mar. 3, 2020, 10 pages.
Office Action dated Nov. 1, 2022, in corresponding Japanese patent Application No. 2019-046771, 8 pages.

* cited by examiner

CENTRAL PROJECTION

EQUIDISTANCE PROJECTION

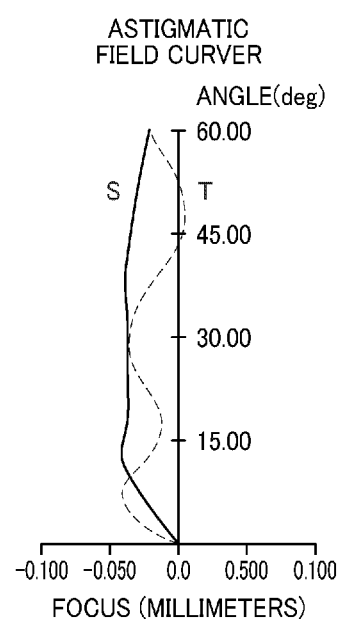

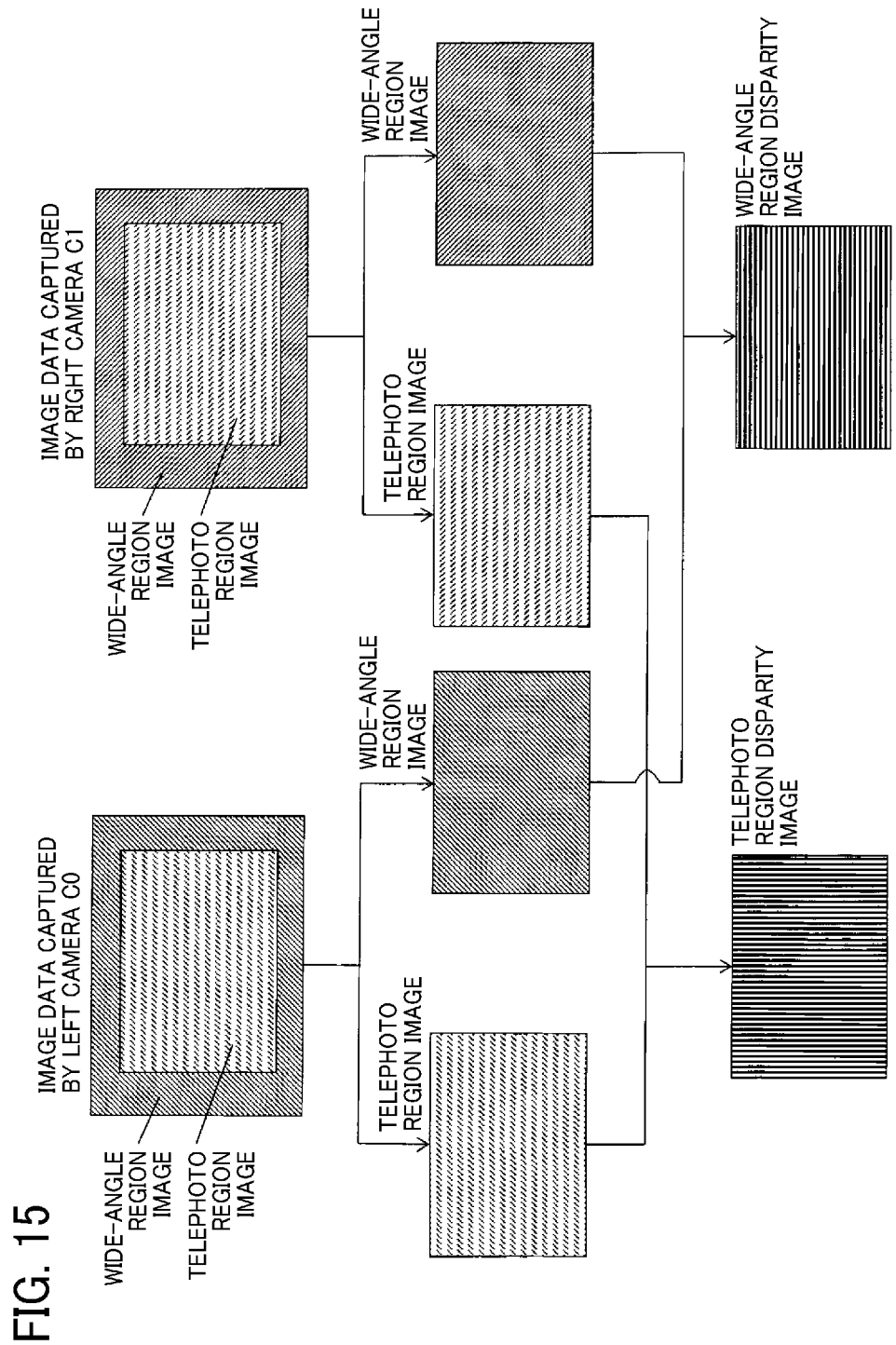

IMAGING DEVICE, IMAGE CAPTURING OPTICAL SYSTEM, AND MOVABLE APPARATUS

CROSS-REFERENCE TO RELATED APPLICATIONS

The present application is based on PCT filing PCT/JP2020/008873, filed Mar. 3, 2020, which claims priority to JP 2019-046771, filed Mar. 14, 2019, the entire contents of each are incorporated herein by reference.

TECHNICAL FIELD

This disclosure relates to an imaging device, an image capturing optical system, and a movable apparatus.

BACKGROUND

Stereo monitoring apparatuses using a stereo camera employing a pair of cameras, such as vehicle-mounted cameras, have been applied to various fields to calculate distance to an object using three-dimensional measurement techniques. The three-dimensional measurement techniques can be performed using the stereo imaging method, in which a pixel block in an image of the object captured by one camera and a corresponding pixel block in an image of the object captured by another camera are identified, and then distance data of the object is calculated using the principle of triangulation based on a disparity of the captured two images, which is a relative displacement amount of the captured two images. The distance to the object can be measured using the calculated distance data, and then the measured distance can be used to assist the vehicle driving such as vehicle-to-vehicle distance control. Further, in addition to information on the front side of one vehicle, a demand for wider field of view (vision) for detecting other vehicles coming from the side of the one vehicle and for detecting pedestrian at an intersection on roads have been increasing.

JP-2012-198077-A discloses a stereo camera apparatus that generates disparity images. The stereo camera apparatus includes two image capturing units, two optical systems, a first image generation unit, a second image generation unit, a first disparity image generation unit, a second disparity image generation unit, and an image synthesizing unit. As to the two image capturing units, optical axes of the two image capturing units are arranged in parallel. The two optical systems project image data captured by the two image capturing units as equidistant projection images.

The first image generation unit generates, from the two equidistant projection images, first modified image data and second modified image data, where the epipolar line becomes a straight line.

The second image generation unit generates, from a given region of the two equidistant projection images, third modified image data and fourth modified image data, in which the image magnification rate of the third modified image data and the fourth modified image data is larger than the image magnification rate of the first modified image data and the second modified image data, and the epipolar line becomes a straight line.

The first disparity image generation unit compares the first modified image data and the second modified image data to generate a first disparity image, in which disparity information is set on each pixel.

The second disparity image generation unit compares the third modified image data and the fourth modified image data to generate a second disparity image, in which disparity information is set on each pixel.

The image synthesizing unit replaces pixel values of the pixels of the first disparity image, determined by the image magnification rate of the first modified image data or the second modified image data and the image magnification rate of the third modified image data or the fourth modified image data, with pixel values of the pixels of the second disparity image.

CITATION LIST

Patent Literature

PTL 1: JP-2012-198077-A

SUMMARY

Technical Problem

In the conventional monitoring apparatus using the stereo imaging method, if the field of view (vision) is set wider, it is difficult to secure a far-side resolution precision, and if the far-side resolution precision is set with a higher priority for the measurement conditions, the data amount required to be processed (i.e., data amount corresponding the resolution of image sensor) increases too large. If the far-side resolution precision is set with the higher priority for the measurement conditions, the system cost increases and the distance between the two camera units of the stereo imaging system becomes longer, with which the size of stereo imaging system increases.

For example, as to the stereo camera apparatus disclosed in JP-2012-198077-A, since the equidistant projection image is used as the original image data to be processed, the processing data amount increases and the processing delay may occur due to the increase of the image correction amount, and further, errors, which may occur during the correction fitting, increases. Further, compared to the central projection image, the angular resolution of the original image data becomes lower.

Typically, a stereo camera apparatus or stereo monitoring apparatus has a relatively higher horizontal resolution (i.e., resolution in X-Y direction or horizontal direction) and relatively lower distance resolution (i.e., resolution in Z direction or depth direction). Further, if the optical system includes a wide-angle lens, the distance resolution such as the far-side resolution precision tends to deteriorate.

The stereo imaging method performs the block matching to obtain disparities and then obtain distance information from the disparities. Since the integer disparity at a far distance region becomes smaller (i.e., distance in the Z direction becomes longer), it is difficult to secure the distance resolution at the far distance region. Therefore, in the far distance region, the fluctuation of disparity acquisition increases, and thereby the fluctuation of range finding values increases.

The above described issue is not unique to the stereo camera apparatus or stereo monitoring apparatus, but is also common to any imaging device and image capturing optical system other than the stereo camera apparatus or stereo monitoring apparatus.

This disclosure discloses an embodiment that is devised in view of the above described issue, in which an imaging device, an image capturing optical system and a movable apparatus, which can secure a field of view in a wide-angle region and a far-side resolution precision in a telephoto region, and achieve compact in size and cost reduction, are disclosed.

Solution to Problem

In one aspect of the present invention, an imaging device includes an imaging element, and an image capturing optical system configured to generate an image of an object on the imaging element. The image capturing optical system has a gradient decreasing region in which a change of a gradient of an image magnification rate with respect to an angle of view of the image generated on the imaging element decreases as a concerned position deviates farther away from an optical axis of the image capturing optical system, and a gradient increasing region in which the change of the gradient of the image magnification rate with respect to the angle of view of the image generated on the imaging element increases as the concerned position deviates farther away from the optical axis of the image capturing optical system.

In another aspect of the present invention, an image capturing optical system used for generating an image of an object on an imaging element includes a gradient decreasing region in which a change of a gradient of an image magnification rate with respect to an angle of view of the image generated on the imaging element decreases as a concerned position deviates farther away from an optical axis of the image capturing optical system, and a gradient increasing region in which the change of the gradient of the image magnification rate with respect to the angle of view of the image generated on the imaging element increases as the concerned position deviates farther away from the optical axis of the image capturing optical system.

In another aspect of the present invention, a movable apparatus includes any one of the above described imaging device and image capturing optical system.

Advantageous Effects of Invention

As to the embodiment of this disclosure, an imaging device, an image capturing optical system and a movable apparatus, which can secure a field of view in a wide-angle region and a far-side resolution precision in a telephoto region, and achieve compact in size and cost reduction, can be provided.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIGS. 10A, 10B, 10C are examples of aberration diagram for the configuration of the image capturing optical system of FIG. 9.

FIG. 15 illustrates a scheme of an image processing by a stereo camera apparatus according to an embodiment.

DESCRIPTION OF EMBODIMENTS

Figure 1:
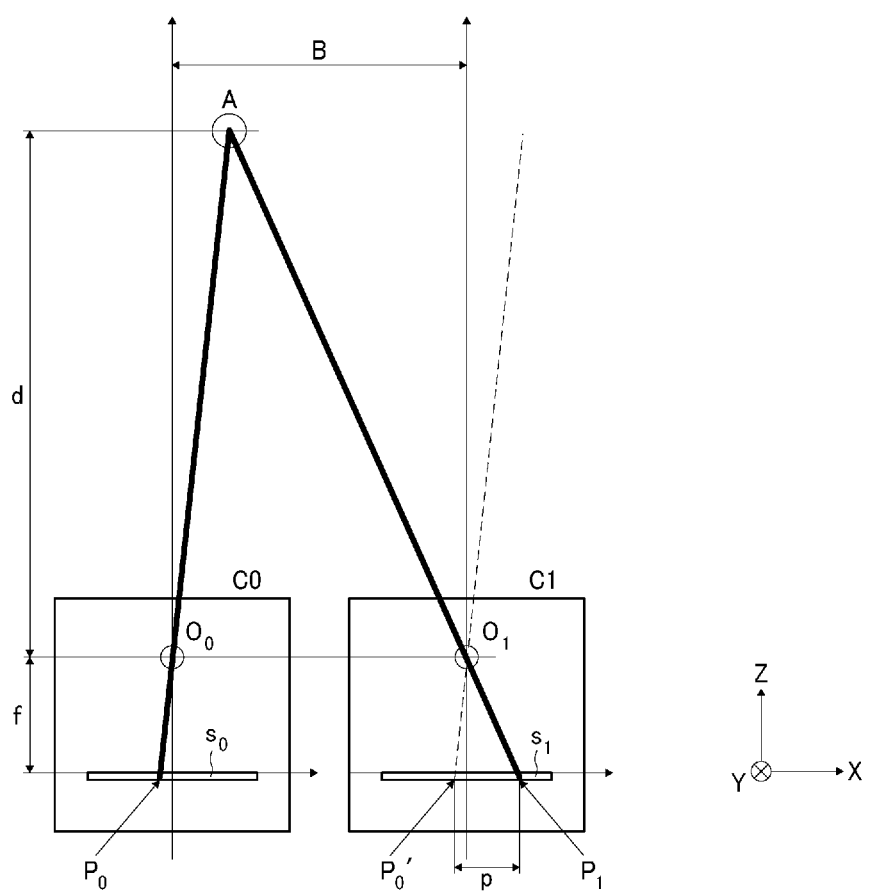
FIG. 1 is a diagram describing the principle of distance measurement or range finding used by a stereo camera including two cameras arranged in parallel.

The terminology used herein is for the purpose of describing particular embodiments only and is not intended to be limiting of the present invention. As used herein, the singular forms "a", "an" and "the" are intended to include the plural forms as well, unless the context clearly indicates otherwise. In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. Hereinafter, a description is given of a configuration for carrying out the present invention with reference to the drawings.

FIG. 1 is a diagram describing the principle of distance measurement or range finding used by a stereo camera including a first camera C0 (left camera) and a second camera C1 (right camera) arranged in parallel. As illustrated in FIG. 1, the first camera C0 and the second camera C1 are disposed by setting a distance B between the center of the first camera C0 and the center of the second camera C1. The focal length, optical center, and image capture plane of the first camera C0 and the second camera C1 are defined as follows.

Focal length: f

Optical center: $O_0$, $O_1$

Image capture plane: $S_0$, $S_1$

As to the first camera C0, an image of an object A, located at a distance "d" from the optical center "$O_0$" of the first camera C0, is focused at a point "$P_0$" that is an intersection point of a straight line of "A-$O_0$" and the image capture plane of "$S_0$." Further, as to the second camera C1, an image of the same subject A is focused at a point "$P_1$" on the image capture plane "$S_1$."

In this configuration, a straight line passing the optical center "$O_1$" of the second camera C1 and parallel to the straight line "A-$O_0$" crosses the image capture plane "$S^1$" at an intersection point of $P_0'$, and the distance between the point $P_0'$ and the point $P_1$ is defined as "p."

The point $P_0'$ in the second camera C1 corresponds to the same position of the point $P_0$ in the first camera C0, and the distance "p" indicates a displacement amount of the positions on two images of the same object A captured by the two cameras (first camera C0 and the second camera C1), which is referred to as disparity. Since a triangle of "A-$O_0$-$O_1$" and a triangle of "$O_1$-$P_0'$-$P_1$" are similar triangles, the relationship of "d=Bf/p" is obtained. Therefore, if the distance B (baseline length) and the focal length "f" of the first camera C0 and the second camera C1 are known, the distance "d" can be calculated from the disparity "p."

The image focusing optical system of the stereo camera projects an image of an object outside the stereo camera onto an image capture plane. The image focusing optical system of the stereo camera employs various methods depending on how an object at one position (direction) is projected onto a position on the image capture plane. Hereinafter, a description is given of the central projection and the equidistant projection, which are typically used.

Figure 2A:
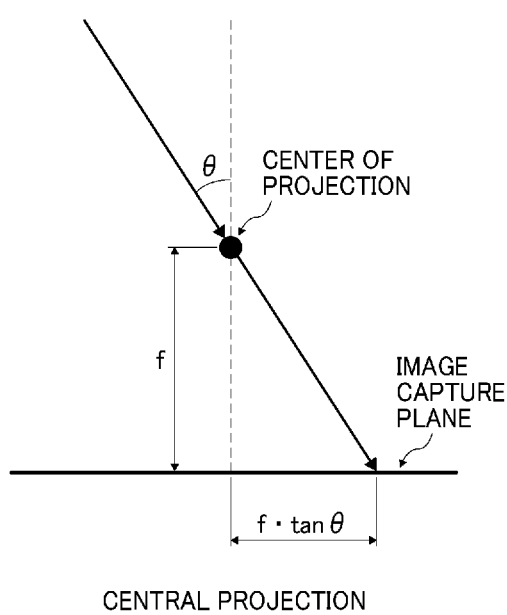
FIGS. 2A and 2B illustrate schemes of a central projection and an equidistant projection.

FIG. 2A is an example of a diagram illustrating a central projection. The central projection is a method of projecting an image of an object located in a direction away from the optical axis of camera for an angle θ at a position that is deviated from the center of the image capture plane (the intersection point with the optical axis) for "f×tan θ." In this method, "f" indicates the focal length of the optical system.

The central projection has a feature that a straight line in a three-dimensional space is projected as a straight line in an image formed on the image capture plane. Typical camera lenses are designed to have this central projection characteristic. In particular, as to the stereo camera, since the epipolar line becomes a straight line, the searching of corresponding points can be easily performed, which is an advantage. However, since the value of "tan θ" diverges at θ=90 degrees, the field of view of 90 degrees or more cannot be projected, and when a wider-angle view having the field of view close to 90 degrees is to be projected, a very large-sized image capture plane is required.

Figure 2B:
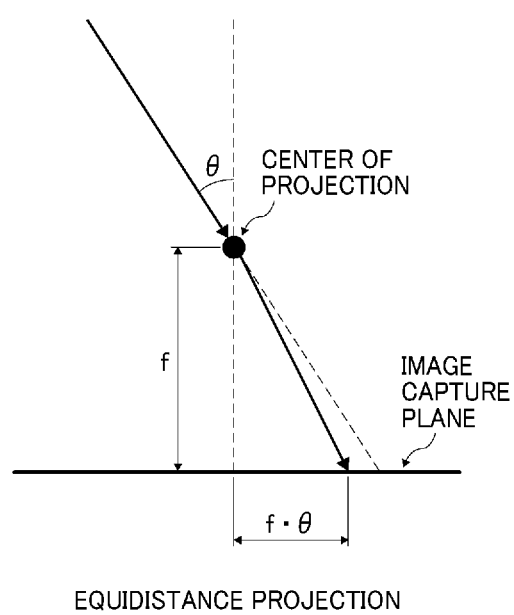

FIG. 2B is an example of a diagram illustrating the equidistant projection. The equidistant projection is a method of projecting an image of an object located in a direction away from the optical axis of camera for an angle θ at a position that is deviated from the center of the image capture plane for "f×θ."

Different from the central projection, the equidistant projection does not diverge at 90 degrees, and can express a wider field of view. Therefore, many fisheye lenses have this equidistant projection characteristic. However, as to the stereo camera using the equidistant projection, since the epipolar line becomes a curve line, the searching of the corresponding points requires the complex processing.

In the conventional stereo camera system, the central projection (FIG. 2A) is typically employed. This is because the epipolar line is defined as the straight line, and the distance conversion from the disparity can be easily calculated using a following formula (1).

$$d = Bf/p \quad (1)$$

wherein "d" denotes "distance", "B" denotes "baseline length" that is the distance between two cameras, "f" denotes "focal length", and "p" denotes "disparity" (p: disparity).

With the increased demand on wider angle of view, the total angle of view of the stereo camera system is being demanded to be 100 degrees or more. As to the central projection, the relationship between the image height and the angle of view is defined by a following formula (2), in which the wider the angle of view, the larger the required image height.

$$y = f \times \tan θ \quad (2)$$

wherein "y" denotes the image height, "f" denotes the focal length, and "θ" denotes the angle of view.

As indicated in the formula (2), the image height "y" can be reduced by reducing the focal length "f." However, if the focal length "f" decreases, a value of the disparity "p" defined by the formula (1) becomes smaller, with which it becomes difficult to secure the far-side resolution precision. Further, the angular resolution at the center of the image decreases, and the size of the object in the center of the image becomes smaller, with which it becomes difficult to detect the object, such as an obstacle, existing at the far side.

The stereo camera apparatus disclosed in JP-2012-198077-A proposes a method of correcting an equidistant projection image to a central projection image, but the correction amount may become too large. For example, a case where an image height of an equidistant projection image having the focal length of 2 mm is corrected to a center projection image having a focal length of 5 mm is considered. If the sensor pitch is 0.00375 mm and the image height of image having the angle of view of 10 degrees in the vertical direction is corrected, an image correction amount of about 142 pixels is required. If the image correction amount increases, the amount of data to be buffered increases, with which the circuit resource becomes larger, the processing device becomes expensive, and thereby the processing delay may occur due to the increased processing load. Further, due to the increase of the image correction amount, the error that might occur during the correction fitting may increase.

In view the above described issues, the stereo camera apparatus according to the embodiment includes, for example, two cameras such as a right-side camera and a left-side camera, in which two regions such as a telephoto region and a wide-angle region are set for each one of the two cameras. The telephoto region is used for the center projection and set with the optical property of lower distortion to reduce the amount of correction, and the wide-angle region is set with a distortion characteristic such that a target angle of view can be covered. The image correction is performed for each of the two regions such as the telephoto region and the wide-angle region respectively to generate an image at each of the telephoto region and the wide-angle region.

By performing the stereo matching to a pair of two images of the telephoto region generated by using the right-side camera and the left-side camera, three-dimensional data of telephoto region can be obtained. Further, by performing the stereo matching to a pair of two images of the wide-angle region generated by using the right-side camera and the left-side camera, three-dimensional data of wide-angle region can be obtained. In this configuration, by performing the image capturing operation of the telephoto region using the central projection optical system, the original data having the higher angular resolution and lower distortion can be obtained, with which the amount of image correction and the error that might occur during the image correction can be reduced, and the processing can be implemented using the circuit having a smaller resource.

As to the lens unit (image capturing optical system) that can reproduce the distortion characteristics as described above, the focal length "f" specified in the formulas (1) and (2) is required to be different clearly between the telephoto region and the wide-angle region, and the focal length of the wide-angle region is required to be shorter than the focal length of the telephoto region.

Further, by setting a convex face for the first lens disposed at the most object side to have the negative power at the object side, the light ray that enters with at a larger angle with respect to the optical axis can be directed to the image capture plane.

Further, by setting the negative power to the second lens disposed at the second most object side to set a retrofocus type power, the lens unit that can capture images sufficiently can be provided even if the focal length becomes shorter, and thereby the productivity of camera system can be ensured. The lens unit (image capturing optical system) of the embodiment will be described later in detail.

Figure 3:
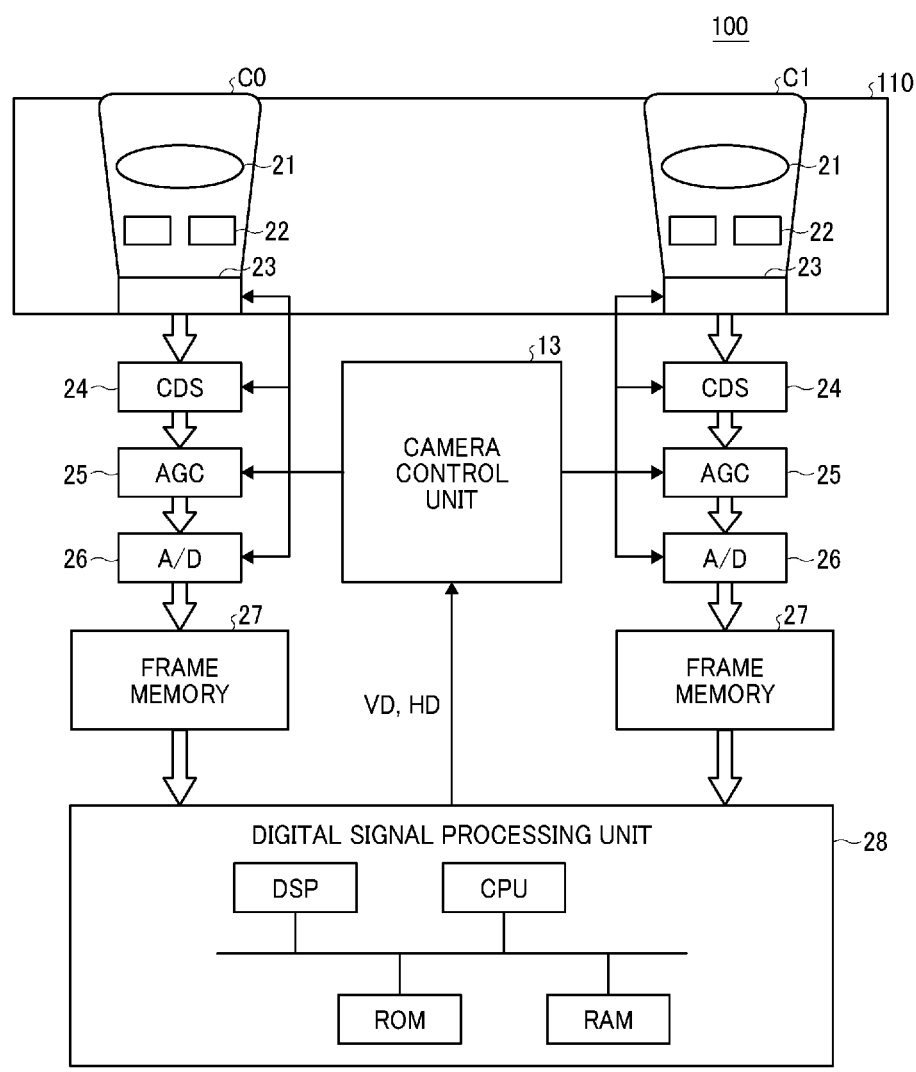
FIG. 3 illustrates an example of a hardware block diagram of a stereo camera apparatus according to an embodiment.

FIG. 3 is a schematic configuration of a stereo camera apparatus 100 according to the embodiment. The stereo camera apparatus 100 can be mounted on, for example, any movable apparatus, such as vehicles and automobiles Specifically, the stereo camera apparatus 100 can be mounted on a back side of a room mirror (rearview mirror) disposed inside the vehicle, or in a front grille of the vehicle. With this configuration, the front visibility can be secured for a vehicle driver. The stereo camera apparatus 100 includes a camera unit 110, which includes a left-side camera C0 (first camera) and a right-side camera C1 (second camera) disposed in parallel. Each of the left-side camera C0 and the right-side camera C1 employs the lens and the complementary metal-oxide-semiconductor (CMOS) image sensor having the same properties. The left-side camera C0 and the right-side camera C1 are arranged so that their respective optical axes are parallel to each other and the two image capture planes are aligned on the same plane. As illustrated in FIG. 3, the left-side camera C0 includes a lens unit 21 (first image capturing optical system), an aperture 22, and a CMOS image sensor 23 (first imaging element) while the right-side camera C1 includes the lens unit 21 (second capturing optical system), the aperture 22, and the CMOS image sensor 23 (second imaging element).

The CMOS image sensor 23 operates when a control signal output by a camera control unit 13 is input. The CMOS image sensor 23 can be, for example, a monochrome image sensor having 1000 pixels×1000 pixels. For example, the lens unit 21 has an angle of view of 80 degrees at each of the upper side, lower side, left side, and right side, which means an angle of view of 160 degrees for the upper-to-lower direction, and an angle of view of 160 degrees for the left-to-right direction, and has a property of forming an image in the angle of view of 160 degrees within an image capture region of the CMOS image sensor 23.

The image signal output from the CMOS image sensor 23 is output to a correlated double sampling (CDS) 24 to remove noise signals by performing the correlated double sampling, then a gain is controlled in accordance with a signal strength by an automatic gain control (AGC) 25, and then the analog-digital (A/D) conversion is performed by an analog-digital (A/D) converter 26. Then, the image signals are stored in a frame memory 27 capable of storing all of the image signals received from the CMOS image sensor 23.

The image signals stored in the frame memory 27 are processed in a digital signal processing unit 28 to calculate the distance or the like, and the format conversion may be performed on the image signals depending on the specification to display images on a device, such as a liquid crystal display (LCD). The digital signal processing unit 28 is, for example, a large-scale integration (LSI) including a digital signal processor (DSP), a central processing unit (CPU), a read only memory (ROM), a random access memory (RAM), or the like. For example, functional units of the stereo camera apparatus 100, to be described later, can be implemented by the digital signal processing unit 28 as hardware, software, or combination of hardware and software. Further, the configuration illustrated in FIG. 3 is just one example, is not limited thereto. For example, the camera control unit 13 can be disposed in the digital signal processing unit 28.

The digital signal processing unit 28 outputs pulses of horizontal synchronizing signal HD, pulses of vertical synchronizing signal VD, and clock signals to the camera control unit 13. Alternatively, the camera control unit 13 can be configured to generate the horizontal synchronizing signal HD and the vertical synchronizing signal VD. The camera control unit 13, including a timing generator and a clock driver, generates control signals for driving the CMOS image sensor 23 from the horizontal synchronizing signal HD, the vertical synchronizing signal VD, and the clock signal.

As above described, the stereo camera apparatus 100 includes the CMOS image sensor 23 (first imaging element) and the lens unit 21 (first image capturing optical system) that projects the image data captured by the CMOS image sensor 23 (first imaging element) for the left-side camera C0, and the CMOS image sensor 23 (second imaging element) and the lens unit 21 (second image capturing optical system) that projects the image data captured by the CMOS image sensor 23 (second imaging element) for the right-side camera C1.

The lens unit 21 (first image capturing optical system, second image capturing optical system) projects the image data onto the telephoto region and the wide-angle region partitioned on the CMOS image sensor 23 (first imaging elements, second imaging element), and has a distortion characteristic that the distortion is relatively smaller in the telephoto region and the distortion is relatively larger in the wide-angle region.

Figure 4:
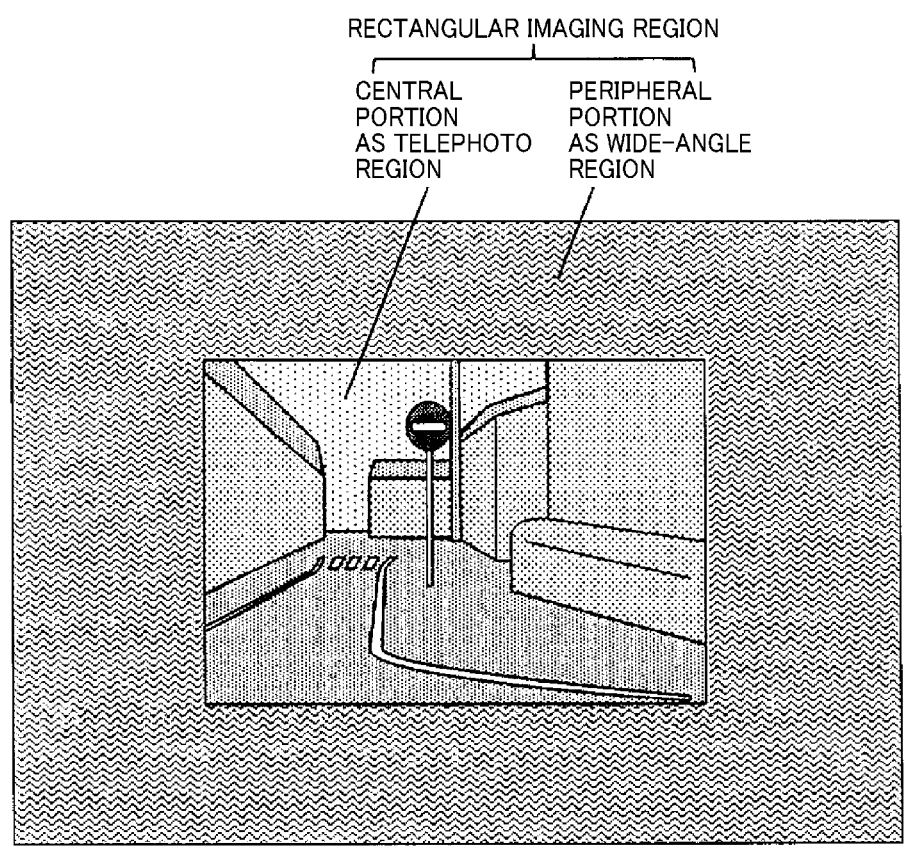
FIG. 4 is a schematic diagram illustrating an example of a telephoto region and a wide-angle region.

FIG. 4 is a schematic view illustrating an example of telephoto region and wide-angle region partitioned for the lens unit 21 (first image capturing optical system, second image capturing optical system).

The image data captured by the CMOS image sensor 23 (first imaging element, second imaging element) has a rectangular image capture region, in which the image capture region is partitioned into a central portion used for the telephoto region, and a peripheral portion used for the wide-angle region.

In an example case of FIG. 4, the telephoto region at the central portion depicts a scene including a road and a road sign viewed from a vehicle, and the wide-angle region at the peripheral portion is simply rendered or drawn with a gradation pattern. A ratio and arrangement pattern of the telephoto region and the wide-angle region set on the image capture region can be changed as needed, and various design changes can be made.

As above described, each of the left-side camera C0 and the right-side camera C1 of the stereo camera apparatus 100 includes the CMOS image sensor 23 (first imaging element, second imaging element) and the lens unit 21 (first image capturing optical system, second image capturing optical system) that forms an image of object on the CMOS image sensor 23. Hereinafter, a description is given of a configuration for implementing the optical characteristic of the lens unit 21 (first image capturing optical system, second image capturing optical system).

Figure 5:
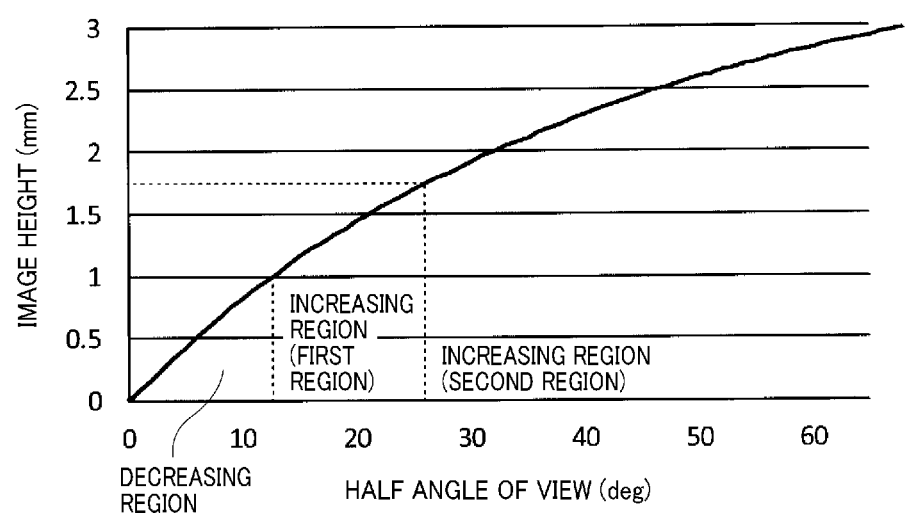
FIG. 5 illustrates a relationship between a half angle of view and an image height in an imaging device and an image capturing optical system according to an embodiment.

FIG. 5 illustrates a relationship between a half angle of view and an image height in the imaging device and the image capturing optical system according to the embodiment.

Figure 6:
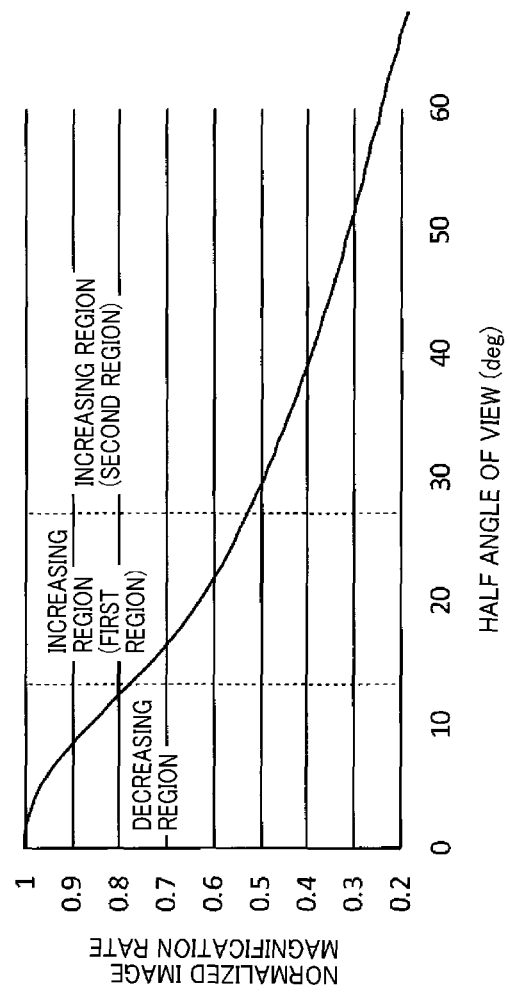
FIG. 6 illustrates a relationship between a half angle of view and an image magnification rate normalized about the center of an angle of view in FIG. 5 in an imaging device and an image capturing optical system according to an embodiment.

FIG. 6 illustrates a relationship between a half angle of view and an image magnification rate normalized about the center of the angle of view in FIG. 5 in the imaging device and the image capturing optical system according to the embodiment.

Figure 7:
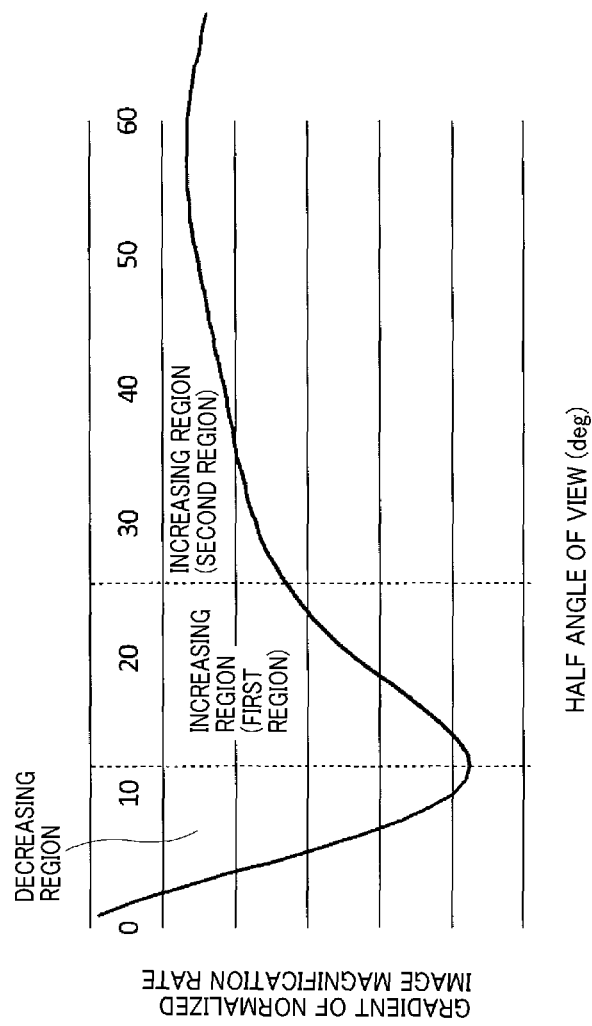
FIG. 7 illustrates a relationship between a half angle of view and a gradient of image magnification rate in an imaging device and an image capturing optical system according to an embodiment.

FIG. 7 illustrates a relationship between a half angle of view and a gradient of image magnification rate in the imaging device and the image capturing optical system according to the embodiment.

The curve profile shown in FIG. 6 represents the first derivative of the curve profile shown in FIG. 5, and the curve profile shown in FIG. 7 represents the second derivatives of the curve profile shown in FIG. 5 (the curve profile shown in FIG. 7 represents the first derivative of the curve profile shown in FIG. 6).

In example cases of FIGS. 5 to 7, a sensor (imaging element) of type 1/2.7 is used, and the diagonal image height is set 3.3 mm, the sensor pitch is set 0.003 mm, and the image resolution is set 1980 pixels×1080 pixels (horizontal× vertical).

Further, one region where the image height is 0 mm to 1 mm (a half angle of view is 0 degree to 13 degrees) is defined as the telephoto region, and another region where the image height is 1 mm to 1.7 mm (a half angle of view is 13 degrees to 26 degrees) is defined as a switching region (a region switching between the telephoto region and the wide-angle region), and still another region where the image height exceeds 1.7 mm (a half angle of view is 26 degrees or more) is defined as the wide-angle region.

As to be described in detail later, the "telephoto region" can be also referred to as "a region where a gradient of image magnification rate with respect to the angle of view of the image of object generated by the CMOS image sensor 23 (imaging element) decreases as the concerned position deviates farther away from the optical axis."

The "switching region" and the "wide-angle region" can be also referred to as "a region where the changing of gradient of the image magnification rate with respect to the angle of view of the image of object generated on the CMOS image sensor 23 (imaging element) increases as the concerned position deviates farther away from the optical axis."

The "switching region" can be also referred to as "a first region" where the changing of the gradient of the image magnification rate with respect to the angle of view of the image of object generated on the CMOS image sensor 23 (imaging element) is relatively large.

The "wide-angle region" can be also referred to as "a second region" where the changing of the gradient of the image magnification rate with respect to the angle of view of the image of object generated on the CMOS image sensor 23 (imaging element) is relatively small.

In the telephoto region, the image height characteristic is set closer to the image height characteristic of the central projection having the focal length of about 5 mm.

In the wide-angle region, the image height characteristic is set closer to the equidistant projection so that the focal length becomes about 1.2 mm for the image height at the outermost position in the horizontal direction.

By providing the above described image height characteristic, the field of view of 120 degrees or more can be secured for the entire image while having a higher angular resolution of about 0.03 degree per pixel in the telephoto region.

If the central projection is simply used to secure the field of view of 120 degrees or more, the angular resolution at the center of the image lowers to about 0.1 degree.

The projection method of the equidistant projection is adopted for the wide-angle region to provide a substantially constant angular resolution regardless of the image height.

Further, the central projection having a further smaller focal length can be adopted for the wide-angle region. Further, the orthographic projection can be adopted for the wide-angle region so that the angular resolution near the center becomes higher as much as possible.

The image height characteristics can be represented by following formulas (3) and (4).

$$y=f\times\tan\theta (y\leq a) \quad (3)$$

$$y=f\theta+B(y>a) \quad (4)$$

where "y" represents the image height, "f" represents the focal length, "θ" represents the angle of view, "B" represents the baseline length (the distance between two camera units), and "a" represents the image height range of the telephoto region and the wide-angle region (i.e., the image height which becomes a boundary between the telephoto region and wide-angle region).

The image height range "a" setting the telephoto region and the wide-angle region becomes values having a given range, which is not defined as one exact boundary value. Therefore, the values of a given range set as the image height range "a" correspond to the "switching region (a region switching between the telephoto region and the wide-angle region" or the "first region of the increasing region)."

If the optical system is configured with the telephoto region and the wide-angle region without providing the switching region, for example, an element that has a ridge in the lens effective diameter in the optical system can be provided, or an element that corresponds to the telephoto region alone and an element that corresponds to the wide-angle region alone can be provided. However, in both cases, when the image capturing is performed symmetrically with respect to the angle of view, the vignetting of light flux occurs at the boundary between the telephoto region and the wide-angle region, so that the dead angle, which cannot be captured as image, may occur.

As to the stereo camera apparatus 100 (imaging device and the image capturing optical system) of the embodiment, which is mounted on the movable apparatus (e.g., vehicle) to improve the safety of the movable apparatus, the deterioration of safety due to the existence of dead angle is not acceptable or tolerable. Therefore, in the embodiment, not only the telephoto region and the wide-angle region are set, but also the switching region is set between the telephoto region and the wide-angle region to eliminate the dead angle for maintaining the safety at a higher level.

Figure 8:
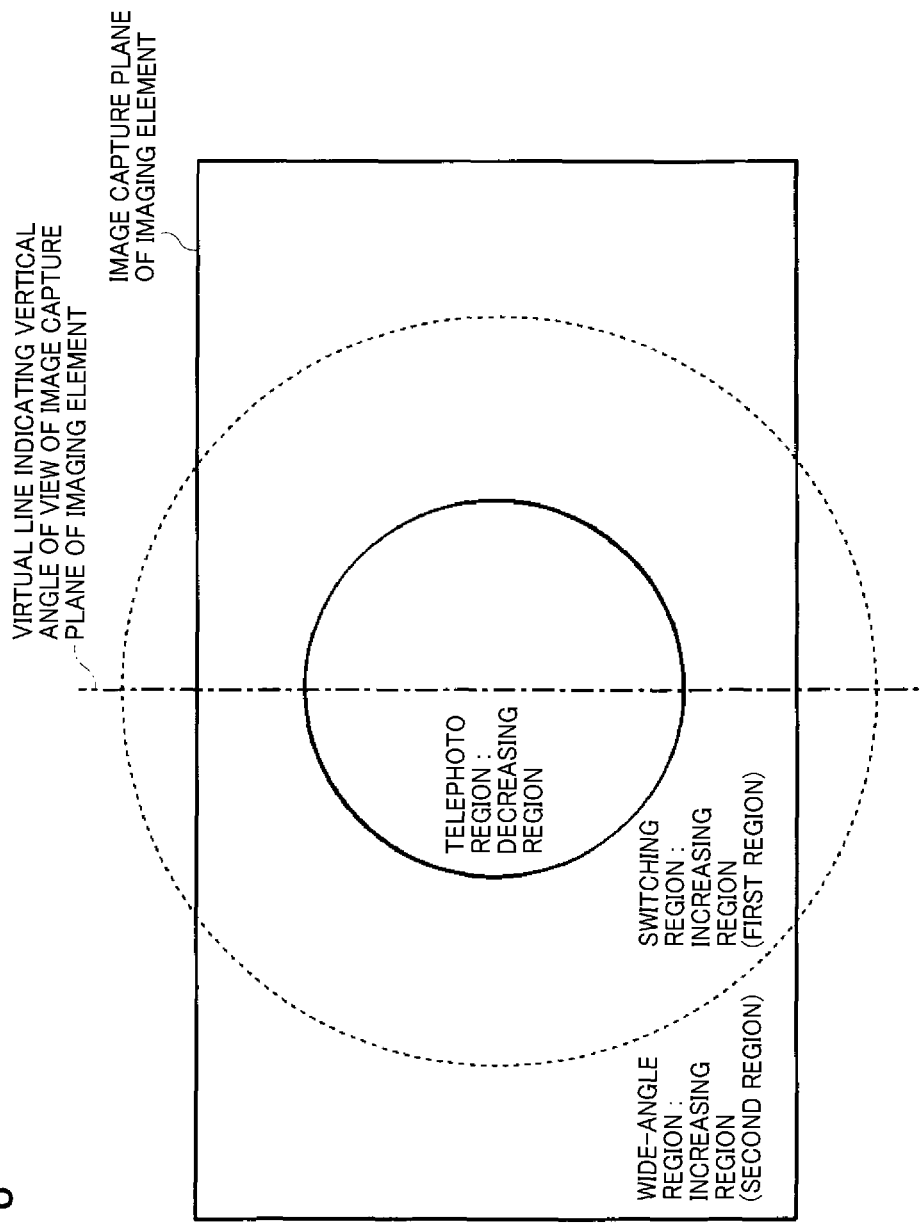
FIG. 8 is a conceptual diagram illustrating an image capture plane of an imaging element viewed from an angle of view from the vertical direction.

FIG. 8 is a conceptual diagram illustrating an image capture plane (effective image capture plane) of the CMOS image sensor 23 (imaging element) viewed from an angle of view from the vertical direction. In FIG. 8, a "virtual line indicating the angle of view in the upper-to-lower direction of the image capture plane of the imaging element" is drawn using a long-dashed short-dashed line extending along the upper-to-lower direction and passing through the center of the image capture plane of the CMOS image sensor 23.

As illustrated in FIG. 8, when the image capture plane of the CMOS image sensor 23 is viewed from the angle of view of the vertical direction, the telephoto region (the decreasing region) is included in the image capture plane, a part of the switching region (the first region of the increasing region) is included in the image capture plane (the remaining part of the switching region is not included in the image capture plane), and the wide-angle region (the second region of the increasing region) is not included in the image capture plane.

In the angle of view of the horizontal direction, a wider field of view is required in an actual driving environment, and it is preferable to capture images from the telephoto region to the wide-angle region.

On the other hand, in the angle of view of the vertical direction, the image capturing is performed in the direction of the road depth direction, but the wide-angle region is not so required compared to the angle of view of the horizontal direction.

Therefore, it is desirable that the angle of view of the horizontal direction is provided to capture an image in the wide-angle region, and the angle of view of the vertical direction is provided to capture an image from the telephoto region to a middle (i.e., middle angle of view) of the switching region and not to capture an image of the wide-angle region.

If the angle of view of the vertical direction is to be increased, the angle of view used for the image capturing of the telephoto region is required to be reduced for both of the horizontal direction and the vertical direction. If the angle of view of the vertical direction is to be decreased, the wide-angle region corresponding to the angle of view of the horizontal direction is required to be reduced.

To secure both of the angle of view of the telephoto region and the angle of view of the wide-angle region, it is desirable that the angle of view of the vertical direction includes the angle of view from the telephoto region to a middle (i.e., middle angle of view) of the switching region.

FIG. 6 illustrates a relationship between a half angle of view and an image magnification rate normalized about the center of the angle of view in FIG. 5 in the imaging device and the image capturing optical system. As indicated in FIGS. 5 and 6, the changing of gradient becomes different when shifting from the telephoto region (the gradient decreasing region) to the switching region (the first region of the gradient increasing region), and further shifting from the switching region (the first region of the gradient increasing region) to the wide-angle region (the second region of the increasing region). Hereinafter, the gradient decreasing region may be simply referred to as the decreasing region, and the gradient increasing region may be simply referred to as the increasing region.

FIG. 7 illustrates the gradient of the normalized image magnification rate characteristic with respect to the angle of view in FIG. 6.

As illustrated in FIG. 7, in the telephoto region (the decreasing region), the changing of the gradient of the image magnification rate with respect to the angle of view of the object image generated on the CMOS image sensor 23 (imaging element) decreases as the concerned position deviates farther away from the optical axis.

In the switching region (the first region of the increasing region) and the wide-angle region (the second region of the increasing region), the changing of the gradient of the image magnification rate with respect to the angle of view of the object image generated on the CMOS image sensor 23 (imaging element) increases as the concerned position deviates farther away from the optical axis.

As illustrated in FIG. 7, in the switching region (the first region of the increasing region), the changing of the gradient of the image magnification rate with respect to the angle of view of the object image generated on the CMOS image sensor 23 (the imaging element) becomes relatively large.

As illustrated in FIG. 7, in the wide-angle region (the second region of the increasing region), the changing of the gradient of the image magnification rate with respect to the angle of view of the object image generated on the CMOS image sensor 23 (the imaging element) is relatively small.

Specifically, in some portions of the wide-angle region, the increase rate of the gradient in the wide-angle region (the second region of the increasing region) becomes a half of the increase rate of the gradient in the switching region (the first region of the increasing region). For example, the maximum value or the minimum value of the increase rate of the gradient in the wide-angle region (the second region of the increasing region) is equal to a half of the maximum value or the minimum value of the increase rate of the gradient in the switching region (the first region of the increasing region).

The gradient of normalized image magnification rate with respect to the half angle of view in FIG. 6 becomes negative over the entire region because the image height characteristic illustrated in FIG. 5 has a negative distortion. As illustrated in FIG. 7, as the angle of view increases from 0 degree, the gradient of the image magnification rate in the telephoto region decreases sharply to shorten the focal length from the focal length of 5 mm, and then the gradient of the image magnification rate in the switching region is increased, which is opposite to the telephoto region (the sign of the gradient is inverted from negative to positive) to continuously connect the focal length of the telephoto region and the focal length of the wide-angle region.

Further, when the gradient of the switching region becomes a half of the maximum gradient value at the upper limit of the angle of view of the switching region, a boundary of the switching region the wide-angle region appears. After shifting to the wide-angle region, the gradient of the image magnification rate changes mildly to set the characteristics closer to the equidistant projection method.

In other words, with respect to the change of the gradient in the switching region and the wide-angle region, the curve profile is formed as a convex curve to the upward so that the focal length can be continuously connected (changed) from the focal length of the telephoto region to the focal length of the wide-angle region, and the characteristic closer to the equidistant projection method can be set in the wide-angle region.

In the above description, the configuration of using three regions such as the telephoto region (the decreasing region), the switching region (the first region of the increasing region) and the wide-angle region (the second region of the increasing region) is described, but is not limited thereto.

For example, as the angle of view increases from 0 degree toward a given angle of view, the gradient of the image magnification rate can be decreased to shorten the focal length from the focal length of 5 mm in a first region, and when the angle of view becomes greater than the given angle of view, a second region where the gradient of the image magnification rate is increased can be set, which is opposite to the first region. In this case too, the imaging device and the image capturing optical system can capture an image of the wider angle of view while capturing an image of the telephoto region near the center with a higher resolution.

Alternatively, the increasing region can be divided into three or more regions, and the increase rate of the gradient of the image magnification rate of the object image generated on the CMOS image sensor 23 (imaging element) with respect to the angle of view can be set with three or more stages.

Figure 9:
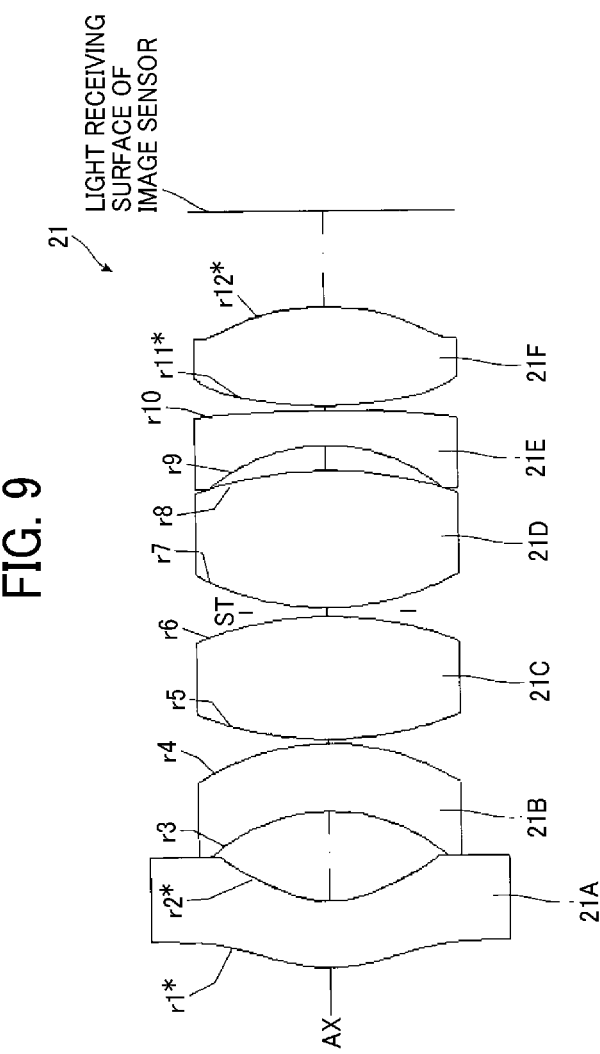
FIG. 9 is a cross-sectional view illustrating a configuration of an image capturing optical system according to an embodiment.

FIG. 9 is a cross-sectional view illustrating a configuration of the lens unit 21 (image capturing optical system), and FIG. 10 is examples of an aberration diagram of the lens unit 21.

As illustrated in FIG. 9, the lens unit 21 (image capturing optical system) includes, for example, a first lens 21A (negative lens), a second lens 21B (negative lens), a third lens 21C (positive lens), an aperture ST, a fourth lens 21D (positive lens), a fifth lens 21E (negative lens), and a sixth lens 21F (positive lens) from the object side to the imaging element side.

The first lens 21A (negative lens) has a meniscus shape having a convex surface toward the object side.

The second lens 21B (negative lens) has a meniscus shape having a convex surface facing the imaging element side with a paraxial curvature.

The third lens 21C (positive lens) has a biconvex shape with a paraxial curvature.

The fourth lens 21D (positive lens) has a biconvex shape with a paraxial curvature.

The fifth lens 21E (negative lens) has a meniscus shape having a convex surface facing the imaging element side with a paraxial curvature.

The sixth lens 21F (positive lens) has a biconvex shape with a paraxial curvature.

In FIG. 9, the number of "ri" (i=1, 2, 3, . . . ) attached to each lens face indicates the i-th lens face, and the face where "ri" is marked with "*" indicates an aspherical face. The aperture ST is also assumed as one face.

With the above described configuration, the light entering from the object side passes through the first lens 21A, the second lens 21B, the third lens 21C, the aperture ST, the fourth lens 21D, the fifth lens 21E and the sixth lens 21F, and then an optical image of the object is generated on the light receiving surface of the CMOS image sensor 23. Then, the CMOS image sensor 23 converts the optical image into electrical signals.

Table 1 and Table 2 indicate examples of construction data of each lens in the configuration of the lens unit 21 (image capturing optical system).

TABLE 1

| Lens data | curvature radius | face interval | refractive index | Abbe number |
|---|---|---|---|---|
| r1* | 3.76 | 1.50 | 1.765 | 49.09 |
| r2* | 2.24 | 2.03 | | |
| r3 | −4.06 | 1.53 | 1.893 | 20.36 |
| r4 | −5.55 | 0.10 | | |
| r5 | 8.14 | 2.78 | 1.497 | 81.54 |
| r6 | −8.14 | 0.10 | | |
| STOP | — | 0.10 | — | — |
| r7 | 6.16 | 3.11 | 1.743 | 49.33 |
| r8 | −8.88 | 0.57 | | |
| r9 | −4.07 | 0.80 | 1.923 | 18.89 |
| r10 | −25.31 | 0.10 | | |
| r11* | 8.21 | 2.23 | 1.497 | 81.54 |
| r12* | −9.98 | 2.18 | | |

TABLE 2

| aspherical coefficient | r1* | r2* | r3* | r4* |
|---|---|---|---|---|
| R | 2.660608.E−01 | 4.469186.E−01 | 1.218116.E−01 | −1.001818.E−01 |
| K | −1.949062.E−01 | −6.543360.E−01 | −5.000000.E+01 | 1.030229.E+01 |
| A | −7.602922.E−03 | −1.889744.E−02 | 4.560988.E−03 | −2.129485.E−02 |
| B | −9.996886.E−04 | −1.874638.E−04 | −6.772422.E−04 | 3.737722.E−03 |
| C | 1.145488.E−04 | −1.709271.E−04 | 8.579672.E−05 | −2.426117.E−04 |
| D | −4.294206.E−06 | 8.530954.E−05 | 3.015945.E−06 | −2.270753.E−06 |
| E | 3.051842.E−08 | −8.602867.E−06 | −7.147313.E−07 | 1.576279.E−06 |
| F | −4.850244.E−10 | 2.330204.E−07 | 2.895192.E−08 | −7.722254.E−22 |

In the construction data of each lens in Table 1 and Table 2, the number "i" of the reference sign "ri" (i=1, 2, 3, . . . ) applied to each lens face corresponds to the corresponding number "i" illustrated in FIG. 9. The face attached with "*" for the number "i" indicates that the face is an aspherical face (a refractive optical face having an aspherical shape or a face having refractive effect equivalent to aspherical face).

In Table 1, the "curvature radius" represents the radius of curvature of each face (mm), the "face interval" represents the interval of adjacent lens faces along an optical axis (face interval along the optical axis) at the infinity focused condition, the "refractive index" represents the refractive index for d-line (wavelength 587.56 nm) of each lens, and the "Abbe number" represents the Abbe number of d-line (wavelength 587.56 nm) of each lens.

In Table 2, the above-described aspherical face data indicates the sag amount (sag amount parallel to z axis) that is calculated using values of the second curved face parameter of the aspherical face (face attached with "*" for the number "i" in the face data) such as conical coefficient and conic coefficient "k," the curvature "c" at the face vertex, the curvature radius "r," the aspherical coefficient of "A, B, . . . J" Specifically, the aspherical shape of the optical face can be defined by a math formula A.

Math Formula A:
$$Z = \frac{cr^2}{1 + \sqrt{1 - (1+k)c^2 r^2}} + Ar^4 + Br^6 + Cr^8 + Dr^{10} + Er^{12} + Fr^{14} + Gr^{16} + Hr^{18} + Jr^{20}$$

Z: sag amount parallel to z axis
c: curvature at face vertex (CUY)
k: conic coefficient (K)

Figure 10A:
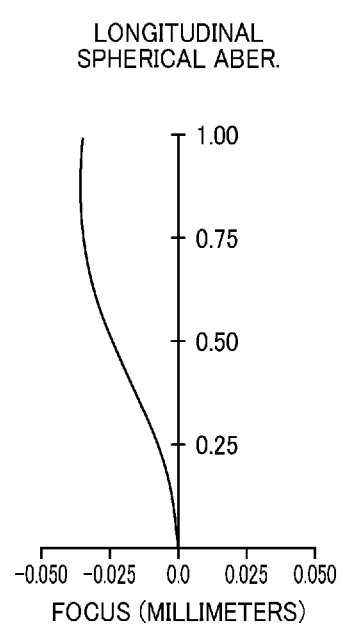
Figure 10C:
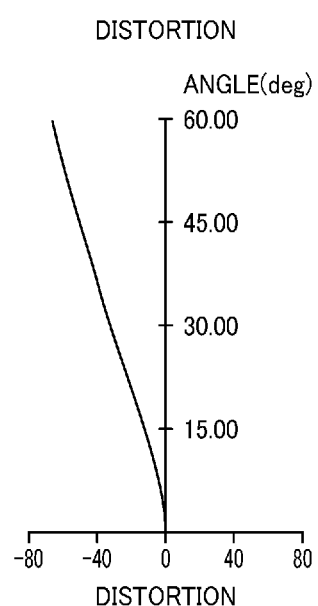

FIG. 10 is an aberration diagram for the configuration of the lens unit 21 (image capturing optical system) of FIG. 9. FIG. 10A illustrates an example of spherical aberration (sinusoidal condition) (Longitudinal Spherical Aberration), FIG. 10B illustrates an example of astigmatism (Astigmatism Field Curves), and FIG. 10C illustrates an example of distortion aberration (Distortion). The horizontal axis of the spherical aberration represents the deviation of the focus position in the unit of "mm," and the vertical axis represents the value normalized by the incident height.

The horizontal axis of the astigmatism represents the deviation of the focus position in the unit of "mm," and the vertical axis represents the image height in the unit of mm.

The horizontal axis of the distortion aberration represents the actual image height as the ratio with respect to the ideal image height, and the vertical axis represents the angle of view in the unit of "degree" (the angle of view up to 60 degrees is shown).

In the astigmatism aberration diagram, the solid line represents the sagittal line while the dashed line represents the tangential line. The diagram of astigmatism aberration and distortion aberration is obtained as the computation result using of the d-line (wavelength 587.56 nm).

As described above, the lens unit 21 (image capturing optical system) includes the first lens 21A disposed at the most object side and the second lens 21B disposed at the second most object side, which means the second lens 21B is disposed after the first lens 21A when viewed from the object side. Then, an aspherical face is formed on both faces of the first lens 21A as indicated in FIG. 9. However, this is just one example. For example, the aspherical face may be formed only on one face of the first lens 21A, or the aspherical face may be formed on one face or both faces of the second lens 21B. That is, at least any one of the first lens 21A and the second lens 21B has the aspherical face at least on one face of the first lens 21A and the second lens 21B.

In order to implement the image magnification rate characteristics illustrated in FIGS. 5 to 7, it is preferable to adopt the aspherical face shape for the lens disposed closer to the object side, in which the light rays are separated by the angle of view. Therefore, it is preferable to set at least one face of one lens (first lens) disposed at the most object side or one face of another lens (second lens) disposed at the second most object side as the aspherical face shape. If the aspherical face is provided on the faces of third and subsequent lenses, the image magnification rate characteristics illustrated in FIGS. 5 to 7 may not be implemented.

Figure 11:
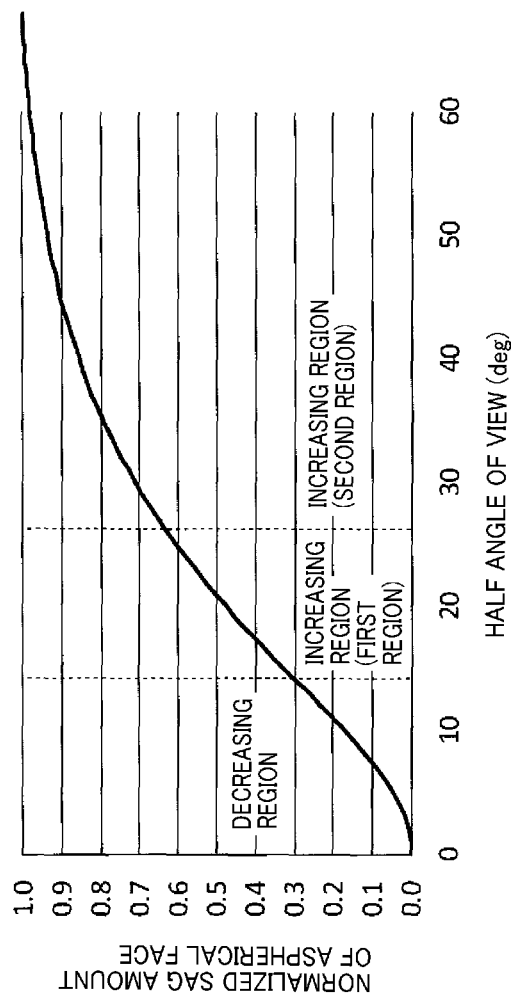
FIG. 11 illustrates a relationship between a half angle of view and normalized sag amount of an aspherical face in an imaging device and an image capturing optical system according to the embodiment.

FIG. 11 illustrates a relationship between a half angle of view and normalized sag amount of an aspherical face in the imaging device and the image capturing optical system according to the embodiment.

Figure 12:
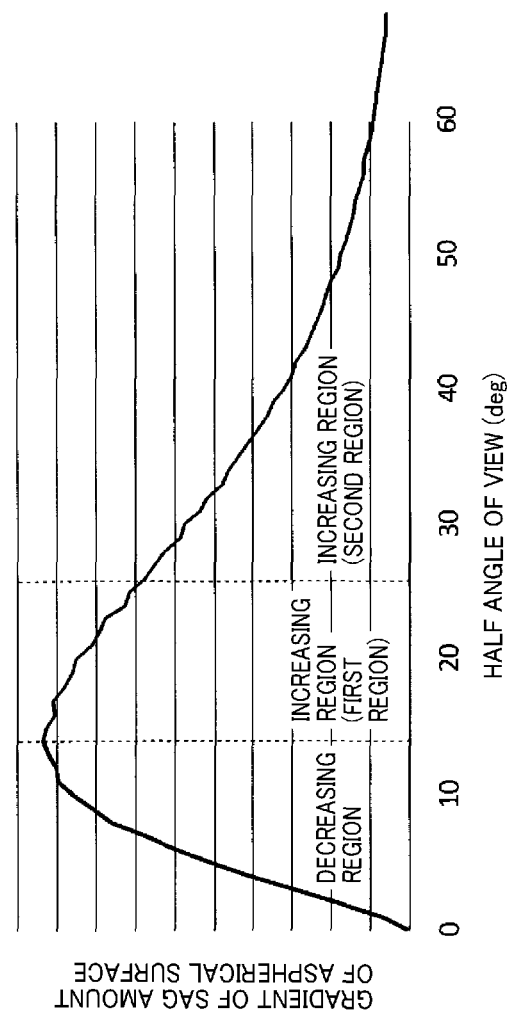
FIG. 12 illustrates a relationship between a half angle of view and a gradient of sag amount of an aspherical face in an imaging device and an image capturing optical system according to the embodiment.

FIG. 12 illustrates a relationship between a half angle of view and a gradient of sag amount of an aspherical face in the imaging device and the image capturing optical system according to the embodiment.

Figure 13:
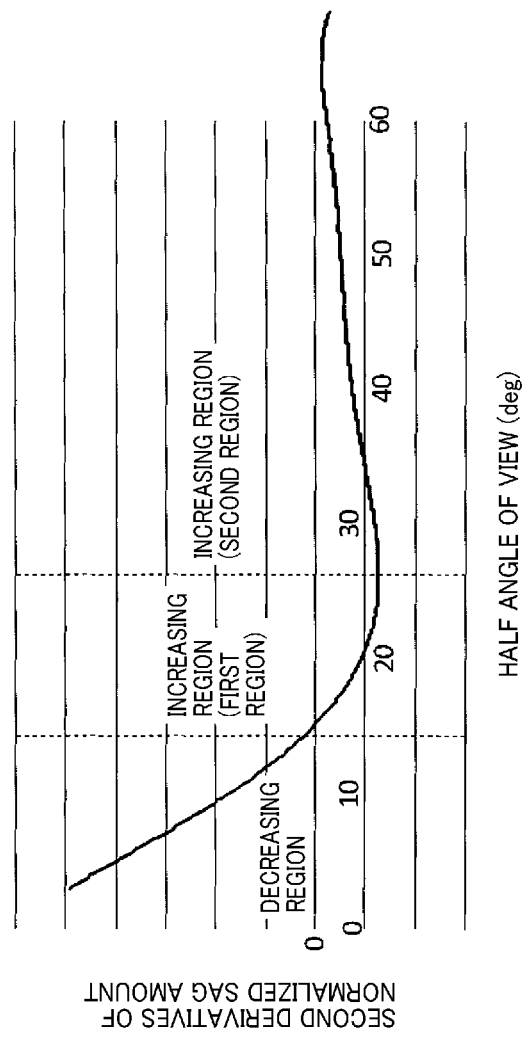
FIG. 13 illustrates a relationship between a half angle of view and second derivatives of normalized sag amount in an imaging device and an image capturing optical system according to the embodiment.

FIG. 13 illustrates a relationship between a half angle of view and second derivatives of the normalized sag amount in the imaging device and the image capturing optical system according to the embodiment.

The curve profile shown in FIG. 12 is the first derivative of the curve profile of FIG. 11, and the curve profile shown in FIG. 13 is the second derivatives of the curve profile shown in FIG. 11 (the curve profile shown in FIG. 13 is the first derivative of the curve profile of FIG. 12).

In FIG. 11, the horizontal axis represents the angle of view and the vertical axis represents the sag amount of the aspherical-faced lens at a light-passing position when an image corresponding to the angle of view on the horizontal axis is captured, in which each sag amount is normalized by the maximum value of sag amount of the lens effective diameter. As indicated in FIG. 11, the normalized sag amount corresponding to the telephoto region (the decreasing region), the switching region (the first region of the increasing region), and the wide-angle region (the second region of the increasing region) are shown, and the gradient change in each region are shown.

If the gradient is inverted at a given angle of view, the processability becomes extremely low, and thereby the gradient is set to the positive side over the entire regions as indicated in FIG. 12. As the angle of view increases from 0 degree, the gradient of the sag amount becomes larger in the positive direction to shorten the focal length from the focal length of 5 mm in the telephoto region (the decreasing region), and the gradient of the sag amount is rapidly decreasing in the switching region (the first region of the increasing region), contrary to the telephoto region (the decreasing region), in order to continuously connect (change) the focal length of the telephoto region (the decreasing region) and the focal length of the wide-angle region (the second region of the increasing region).

Further, when the image capturing is performed in the wide-angle region (the second region of the increasing region), the gradient of the sag amount is set gradually smaller to set the characteristic closer to the equidistant projection method.

In other words, the shape of the aspherical face provided at least one of the first lens 21A and the second lens 21B is set with the characteristic that the sign of gradient of the sag amount with respect to the angle of view is not inverted in the telephoto region (the decreasing region) as illustrated in FIG. 12.

Further, the gradient of the sag amount with respect to the angle of view is being increased in the telephoto region (the decreasing region) without the sign inversion, and the sign of the gradient of the sag amount with respect to the angle of view changes from the increasing to the decreasing for the switching region (the first region of the increasing region) and the wide-angle region (the second region in the increasing region).

As illustrated in FIG. 12, as the angle of view increases from 0 degree, the gradient of the sag amount is inverted when the region changes from the telephoto region (the decreasing region) to the switching region (the first region of the increasing region).

Therefore, as illustrated in FIG. 13, the second derivatives values, which are positive values in the telephoto region (the decreasing region), are inverted to the negative values in the switching region (the first region in the increasing region). Further, to set the characteristics closer to the equidistant projection method in the wide-angle region (the second region of the increasing region), a characteristic that the gradient is inverted in a portion or range, where the second derivatives value is being the negative values, is provided.

In other words, in the curve profile illustrated in FIG. 13 that is calculated by performing the second derivatives to the curve profile indicating the sag amount with respect to the angle of view illustrated in FIG. 11, as the angle of view increases from 0 degree, the second derivatives values change from the positive value to the negative value, and the gradient of the tangent of the second derivate curve is inverted from the negative value to the positive value in the range where the values are negative. In an example case of FIG. 13, the gradient of the tangent of the second derivate curve is inverted from the decreasing to the increasing near the boundary between the switching region (the first region of the increasing region) and the wide-angle region (the second region of the increasing region).

For example, in an example cases of FIGS. 5 to 7 and FIGS. 11 to 13, when the maximum horizontal angle of view is defined as "θa" and an arbitrary angle of view in the switching region (the first region of the increasing region) is defined as "θc," it is preferable to satisfy a relationship of "θc/θa>0.15." In the embodiment, the maximum horizontal angle of view "θa" is set to 60 degrees. If this condition formula (i.e., θc/θa>0.15) is satisfied, a sufficient switching region (the first region of the increasing region) can be set for the imaging region (effective imaging region) of the lens unit 21 (image capturing optical system).

If this condition formula (i.e., θc/θa>0.15) is not satisfied, the sufficient switching region (the first region of the increasing region) cannot be set for the imaging region (the effective imaging region) of the lens unit 21 (image capturing optical system), and it becomes difficult to implement the image magnification rate characteristics illustrated in FIGS. 5 to 7. Further, the wide-angle region (the second region in the increasing region) that can be used for the image capturing operation decreases.

Figure 14:
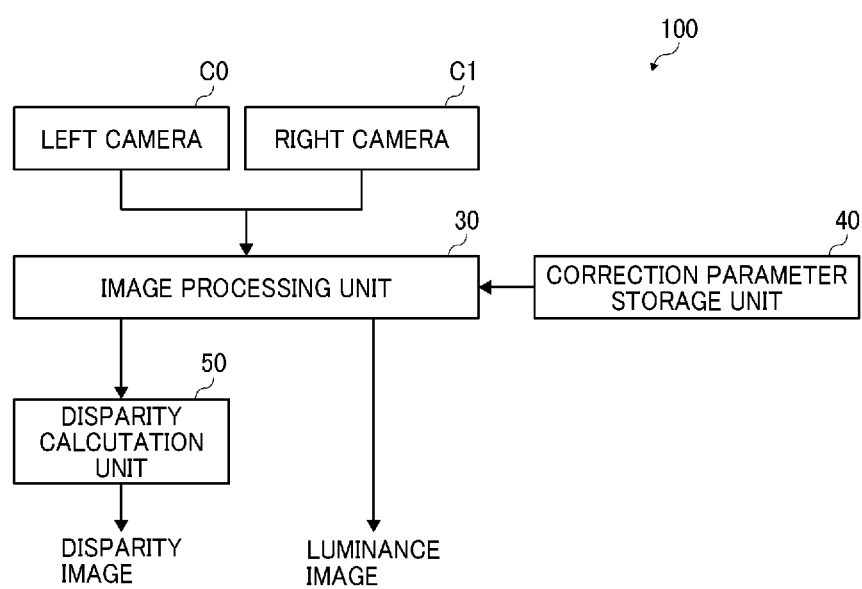
FIG. 14 illustrates an example of a functional block diagram of a stereo camera apparatus according to an embodiment.

FIG. 14 is an example of a functional block diagram of the stereo camera apparatus 100. As illustrated in FIG. 14, the stereo camera apparatus 100 includes, for example, an image processing unit 30 to which image data of the left-side camera C0 (first camera) and the right-side camera C1 (second camera) are input.

The image processing unit 30 is connected to a correction parameter storage unit 40 and a disparity calculation unit 50. The correction parameter storage unit 40, implemented by a non-volatile memory, stores correction parameters used for correcting image data (captured image data including the telephoto region set with lower distortion and the wide-angle region set with higher distortion) captured by the left-side camera C0 and the right-side camera C1 (imaging device, image capturing optical system).

Further, the disparity calculation unit 50 can be included as a functional unit of the image processing unit 30. Further, the image processing unit 30, the correction parameter storage unit 40, and the disparity calculation unit 50 can be included as a functional unit of the digital signal processing unit 28 illustrated in FIG. 3.

The image processing unit 30 refers to the correction parameters stored in the correction parameter storage unit 40 to perform the image processing to the image data captured through the lens unit 21 (image capturing optical system) included in the left-side camera C0 and the right-side camera C1 (imaging devices) in line with the telephoto region and the wide-angle region. More specifically, the image processing unit 30 performs the distortion correction on each image data captured through the lens unit 21 (image capturing optical system) included in the left-side camera C0 and the right-side camera C1 (imaging devices), and sets the distortion correction amount in the telephoto region relatively smaller and the distortion correction amount in the wide-angle region. relatively larger.

As described above, the lens unit 21 (image capturing optical system) included in the left-side camera C0 and the right-side camera C1 (imaging devices) has a specific distortion characteristic, in which the distortion in the telephoto region is set substantially zero (set relatively smaller) and the distortion increases rapidly when shifting to the wide-angle region (set relatively larger). The correction parameters optimized in accordance with the distortion characteristic are stored in the correction parameter storage unit 40. The image processing unit 30 performs a geometric correction, in which the distortion correction amount in the telephoto region is set substantially zero while the distortion correction amount in the wide-angle region is gradually increased in line with the above described rapid increase of the distortion to cancel the effect of the rapid increase of the distortion. As a result, the processed image data (correction processed data) of the telephoto region and the processed image data (correction processed data) of the wide-angle region are generated, respectively. By performing the image processing (correction processing) that is respectively optimized for the telephoto region and the wide-angle region, the field of view in the wide-angle region can be secured, the far-side resolution precision in the telephoto region can be secured, and the size-reduction and cost reduction of the imaging device can be achieved.

The disparity calculation unit 50 outputs a disparity image by performing a disparity calculation operation on the image data, which has received the image processing (correction processing) by the image processing unit 30. More specifically, the disparity calculation unit 50 calculates a telephoto region disparity image, which is a disparity of a telephoto region image captured by the left-side camera C0 and a telephoto region image captured by the right-side camera C1, and also calculates a wide-angle region disparity image, which is a disparity of a wide-angle region image captured by the left-side camera C0 and a wide-angle region image captured by the right-side camera C1. Further, the disparity calculation unit 50 synthesizes the telephoto region disparity image and the wide-angle region disparity image to output an integrated disparity image.

In addition to the image processing such as the correction processing described above, the image processing unit 30 can perform other correction processing, such as restoring the lowered modulation transfer function (MTF) characteristic, correcting the shading (correcting peripheral light quantity), and reducing the noise, to output a luminance image that has improved the image quality. By correcting the images into the images captured by the left-side camera C0 and the right-side camera C1 (imaging device) by matching the baseline direction and the horizontal direction, the disparity in the horizontal direction can be calculated, and then an accurate disparity image can be output.

The above described processing by the image processing unit 30, the correction parameter storage unit 40, and the disparity calculation unit 50 can be referred to as, for example, a stereo matching process.

FIG. 15 is a schematic diagram illustrating an example of a flow of an image processing performed by the stereo camera apparatus 100 according to the embodiment. The image conversion is performed to each of the telephoto region and the wide-angle region for each image data (luminance image) captured by the left-side camera C0 and the right-side camera C1 (the wide-angle region can be assumed as the entire image region including the telephoto region).

The telephoto region image can be set with a characteristic of the central projection, and generated as a region image of 1.2 mm×0.9 mm (horizontal×vertical) and a diagonal image height of 1.5 mm. Further, by setting the same resolution for the telephoto region image and the wide-angle region image (e.g., 640 pixels×480 pixels), the stereo camera apparatus 100 can be implemented using a simple system configuration.

Further, although the correction amount increases in the wide-angle region image, the required correction amount can be reduced to half by reducing the resolution to half. Further, the resolution of the telephoto region image can be increased to two times of a given resolution so that the resolution of the telephoto region image and the resolution of the wide-angle region image can be matched at the same level to utilize the image quality of the wide-angle region image.

Further, although the system configuration may become complex, the telephoto region image (640 pixels×480 pixels) and the wide-angle region image (1280 pixels×960 pixels) can be generated without changing the resolution (i.e., using given resolution such as originally-set resolution).

In the above described configuration, the telephoto region disparity image, which is a disparity of a pair of telephoto region images captured by the left-side camera C0 and the right-side camera C1, is generated. Further, the wide-angle region disparity image, which is a disparity of a pair of wide-angle region images captured by the right-side camera C1 and the left-side camera C0, is generated. By synthesizing the telephoto region disparity image and the wide-angle region disparity image, an integrated disparity image is generated.

In the above described configuration, the imaging device and the image capturing optical system according to the embodiment are applied to the stereo camera apparatus 100, but is not limited thereto. The imaging device and the image capturing optical system according to the embodiment can be applied to any apparatus and system, in which various design changes can be made as needed. For example, the imaging device and the image capturing optical system according to the embodiment can be applied to security cameras (monitoring cameras) disposed at various facilities (such as factories), operation control cameras disposed along railway lines, industrial robots, and fork lifts.

Further, the imaging device and the image capturing optical system according to the embodiment can be also applied to a single camera (a camera having a single eye) in addition to a case where two cameras (the first and second cameras) are used as a set of cameras.

Further, for example, the imaging device and the image capturing optical system according to the embodiment can be applied to monocular security cameras disposed at commercial facilities having a wide space in both depth and width. In this case, the center can be monitored with a higher angular resolution while monitoring the wide-angle region, with which the crime detection or prevention effect can be enhanced with less cost compared to cameras having a conventional zooming function.

In the above described configuration, the imaging device and the image capturing optical system according to the embodiment are provided as an image acquisition unit of the stereo camera apparatus 100, but is not limited thereto. The imaging device and the image capturing optical system according to the embodiment can be applied as an image acquisition unit of any apparatus other than the stereo camera apparatus 100.

In the above described configuration, the imaging device and the image capturing optical system according to the embodiment are applied to one case where the imaging device and the image capturing optical system are disposed in the vehicle used as the movable apparatus, but is not limited thereto. The imaging device and the image capturing optical system according to the embodiment can be applied to any movable apparatus other than the vehicle.

Alternatively, the imaging device and the image capturing optical system according to the embodiment can applied to any fixed apparatuses other than the movable apparatus. For example, the imaging device and the image capturing optical system according to the embodiment can be applied to security cameras (monitoring cameras) used as the fixed apparatus. In this case, the center region having a higher attention level can be captured with a higher resolution, and the surrounding region having a lower attention can be captured with a lower resolution.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium. The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of nonvolatile memory capable of storing a large amount of data. The hardware resources may additionally include an input device, an output device, or a network device, depending on the type of the apparatus. Alternatively, the HDD may be provided outside the apparatus as long as the HDD is accessible. In this example, the CPU, such as a cashe memory of the CPU, and the RAM may function as a physical memory or a primary memory of the apparatus, while the HDD may function as a secondary memory of the apparatus.

Each of the functions of the described embodiments may be implemented by one or more processing circuits or circuitry. Processing circuitry includes a programmed processor, as a processor includes circuitry. A processing circuit also includes devices such as an application specific simultaneous circuit (ASIC), digital signal processor (DSP), field programmable gate array (FPGA) and conventional circuit components arranged to perform the recited functions.

Each of the embodiments described above is presented as an example, and it is not intended to limit the scope of the present disclosure. Numerous additional modifications and variations are possible in light of the above teachings. It is therefore to be understood that, within the scope of the appended claims, the disclosure of this specification can be practiced otherwise than as specifically described herein.

This patent application is based on and claims priority pursuant to Japanese Patent Application 2019-046771, filed on Mar. 14, 2019 in the Japan Patent Office, the entire disclosure of which is hereby incorporated by reference herein.

REFERENCE SIGNS LIST

100 Stereo camera apparatus (imaging device)
C0, C1 Camera (imaging device)
13 Camera control unit
21 Lens unit (image capturing optical system)
22 Aperture
23 CMOS image sensor (imaging element)
24 CDS
25 AGC
26 A/D converter
27 Frame memory
28 Digital signal processing unit
30 Image processing unit
40 Correction parameter storage unit
50 Disparity calculation unit

The invention claimed is:

1. An imaging device comprising:
an imaging element; and
an image capturing optical system configured to generate an image of an object on the imaging element, the image capturing optical system having a gradient decreasing region in which a change of a gradient of an image magnification rate with respect to an angle of view of the image generated on the imaging element decreases as a concerned position deviates farther away from an optical axis of the image capturing optical system, and a gradient increasing region in which the change of the gradient of the image magnification rate with respect to the angle of view of the image generated on the imaging element increases as the concerned position deviates farther away from the optical axis of the image capturing optical system,
wherein the gradient increasing region includes a first region in which an increase rate of the gradient is a first rate, and a second region in which the increase rate of the gradient is a second rate that is smaller than the first rate, and
wherein when an image capture plane of the imaging element is viewed from an angle of view from a vertical direction of the imaging element, the gradient decreasing region is included in the image capture plane, a part of the first region is included in the image capture plane, and the second region is not included in the image capture plane.

2. The imaging device according to claim 1,
wherein the increase rate of the gradient in the second region becomes a half of the increase rate of the gradient in the first region.

3. The imaging device according to claim 1,
wherein the image capturing optical system includes at least a first lens disposed at the most object side, and a second lens disposed at the second most object side right after the first lens, and at least one face of any one of the first lens and the second lens has an aspherical face.

4. The imaging device according to claim 3,
wherein a shape of the aspherical face has a characteristic in which a sign of a gradient of sag amount with respect to the angle of view is not inverted in the gradient decreasing region.

5. The imaging device according to claim 4,
wherein the gradient of the sag amount is being increased without inverting the sign in the gradient decreasing region, and the sign of the gradient of the sag amount inverts from increasing to decreasing in the gradient increasing region.

6. The imaging device according to claim 4,
wherein when a curve indicating the sag amount with respect to the angle of view is differentiated twice to obtain a second derivative curve profile, values of the second derivative curve profile change from positive values to negative values, and a gradient of a tangent of the second derivative curve profile inverts from decreasing to increasing in a range of the negative values.

7. The imaging device according to claim 1,
wherein when a maximum horizontal angle of view is defined as $\theta a$ and an arbitrary angle of view in the first region is defined as $\theta c$, a relationship of $\theta c/\theta a > 0.15$ is satisfied.

8. The imaging device according to claim 7,
wherein the imaging device is used as an image information acquisition unit of a stereo camera apparatus.

9. A movable apparatus comprising the imaging device of claim 1.

10. The imaging device according to claim 1,
wherein a maximum value or a minimum value of the increase rate of the gradient in the second region becomes a half of a maximum value or a minimum value of the increase rate of the gradient in the first region.

11. The imaging device according to claim 1, wherein the gradient increasing region is even further away from the optical axis of the image capturing optical system than the gradient decreasing region.

12. An image capturing optical system for generating an image of an object on an imaging element, comprising:
a gradient decreasing region in which a change of a gradient of an image magnification rate with respect to an angle of view of the image generated on the imaging element decreases as a concerned position deviates farther away from an optical axis of the image capturing optical system; and
a gradient increasing region in which the change of the gradient of the image magnification rate with respect to the angle of view of the image generated on the imaging element increases as the concerned position deviates farther away from the optical axis of the image capturing optical system,
wherein the gradient increasing region includes a first region in which an increase rate of the gradient is a first rate, and a second region in which the increase rate of the gradient is a second rate that is smaller than the first rate, and
wherein when an image capture plane of the imaging element is viewed from an angle of view from a vertical direction of the imaging element, the gradient decreasing region is included in the image capture plane, a part of the first region is included in the image capture plane, and the second region is not included in the image capture plane.

* * * * *